United States Patent
Jang et al.

(10) Patent No.: US 9,446,273 B2
(45) Date of Patent: Sep. 20, 2016

(54) METHOD OF DETOXIFYING ASBESTOS CONTAINED IN WASTE SLATE AND DETOXIFIED ASBESTOS OBTAINED THROUGH THE SAME

(71) Applicant: KOREA INSTITUTE OF GEOSCIENCE AND MINERAL RESOURCES, Daejeon (KR)

(72) Inventors: Young-Nam Jang, Daejeon (KR); Kyungsun Song, Daejeon (KR); Myung Gyu Lee, Daejeon (KR); Soo-Chun Chae, Seoul (KR); Hwanju Jo, Daejeon (KR); Jun-Hwan Bang, Daejeon (KR); Kyoung Won Ryu, Daejeon (KR)

(73) Assignee: KOREA INSTITUTE OF GEOSCIENCE AND MINERAL RESOURCE, Daejeon (KR)

( * ) Notice: Subject to any disclaimer, the term of this patent is extended or adjusted under 35 U.S.C. 154(b) by 12 days.

(21) Appl. No.: 14/309,706

(22) Filed: Jun. 19, 2014

(65) Prior Publication Data
US 2014/0378735 A1 Dec. 25, 2014

(30) Foreign Application Priority Data
Jun. 25, 2013 (KR) .................. 10-2013-0072999

(51) Int. Cl.
*A62D 3/36* (2007.01)
*B09B 3/00* (2006.01)
*A62D 101/41* (2007.01)

(52) U.S. Cl.
CPC . *A62D 3/36* (2013.01); *B09B 3/00* (2013.01); *B09B 3/0066* (2013.01); *A62D 2101/41* (2013.01); *A62D 2203/04* (2013.01); *B09B 3/0083* (2013.01)

(58) Field of Classification Search
None
See application file for complete search history.

(56) References Cited

U.S. PATENT DOCUMENTS

| | | | | |
|---|---|---|---|---|
| 3,708,014 A | * | 1/1973 | Wally | A62D 3/36 134/3 |
| 3,846,527 A | * | 11/1974 | Winter | C04B 35/62227 264/623 |
| 5,258,562 A | * | 11/1993 | Mirick | A62D 3/35 423/167.1 |
| 5,763,738 A | * | 6/1998 | Sugama | A62D 3/36 423/659 |
| 2005/0096495 A1 | * | 5/2005 | Mason | A62D 3/33 588/252 |
| 2006/0106272 A1 | * | 5/2006 | Brown | A62D 3/36 588/313 |
| 2010/0130806 A1 | * | 5/2010 | Sakakibara | A62D 3/36 588/318 |

FOREIGN PATENT DOCUMENTS

| | | |
|---|---|---|
| JP | 3066976 | 5/2000 |
| JP | 2007-222698 A | 9/2007 |
| JP | 2008-132479 | 6/2008 |
| JP | 2011-72917 A | 4/2011 |
| KR | 10-2009-0091126 | 8/2009 |
| KR | 10-2012-0024103 | 3/2012 |
| WO | 2008093368 | * 8/2008 |

OTHER PUBLICATIONS

Japanese Office action with English Translation for Patent Application No. 2014-106147, dated Feb. 18, 2015, 32 pages.

* cited by examiner

*Primary Examiner* — Melvin C Mayes
*Assistant Examiner* — Sheng H Davis
(74) *Attorney, Agent, or Firm* — Lewis Roca Rothgerber Christie LLP

(57) ABSTRACT

Disclosed is a method of detoxifying asbestos of waste slate. The method includes concentrating the asbestos by introducing hydrochloric acid aqueous solution into waste slate powder to dissolve and remove a limestone component contained in the waste slate; and mixing the concentrated asbestos with oxalic acid and performing a low-temperature heat treatment. The waste slate is crushed and pulverized and powder of the crushed and pulverized waste slate is formed in a size in a range of 100 meshes to 300 meshes. The detoxified asbestos includes re-crystallized magnesium oxalate having a rhombohedral or amorphous shape.

6 Claims, 8 Drawing Sheets

METHOD OF DETOXIFYING ASBESTOS CONTAINED IN WASTE SLATE AND DETOXIFIED ASBESTOS OBTAINED THROUGH THE SAME

CROSS-REFERENCE TO RELATED APPLICATION

This application claims the benefit under 35 U.S.C. §119 of Korean Patent Application No. 10-2013-0072999 filed on Jun. 25, 2013 in the Korean Intellectual Property Office, the entirety of which disclosure is incorporated herein by reference.

BACKGROUND OF THE INVENTION

1) Field of the Invention

The present invention relates to a method of detoxifying asbestos, and more particularly, to a method of detoxifying asbestos harmful to a human body and contained in a waste slate at low temperature by using hydrochloric acid and organic acid.

2) Background of Related Art

Asbestos is a term that generally calls fibrous silicate inorganic mineral material produced when the structure of serpentine, hornblende or olivine is changed into the fibrous structure. It is appropriately understood that the asbestos is a natural mineral material produced when the structure of serpentine, hornblende or olivine is changed into the fibrous structure.

In common, as described above, the asbestos is produced in the form of a fibrous assembly, that is, in the form of a bundle. In addition, the asbestos is easily separated from a commonplace dry rock, and split into smaller pieces along a cleavage surface.

The asbestos has excellent tensile force and flexibility and in addition, various excellent properties such as incombustibility. In addition, the asbestos has the merits of being very inexpensive in mining and processing.

Thus, the asbestos products have been used for construction and architecture materials, electronic products, household articles and medicines, and more particularly, used for vehicle components such as vehicle brake lining, a clutch and a gasket. Meanwhile, the asbestos has been utilized for construction materials such as an asbestos slate, an asbestos ceiling material, an asbestos partition, and an extrusion molded cement plate.

The roofs of straw-thatched houses in rural area had been changed into roofs of asbestos slate in a bid of the campaign called "Saemaeul Movement" (New Community Movement, or New Village Movement) in Korea However, the asbestos, which is a top carcinogen appointed by IARC (International Agency For Research on Cancer) under WHO (World Health Organization), may cause lung cancer, asbestosis, malignant mesothelioma that causes cancer in pleura, or pleura thickening after the incubation period of 20 to 40 years elapses since a person breathed in asbestos dusts.

Specifically, when the asbestos exists in the fibrous structure, the asbestos is fatal to the human body. Thus, taking into account the harmful influence of the asbestos on the human body, the occupation safety and health acts have prohibited the product such as a construction material containing the asbestos of 0.1% or more from being manufactured, imported and used from Jan. 1, 2009. In addition, after 2011, the treatment and movement of all materials containing the asbestos of 1% or more have been illegal.

Currently, as described above, since the asbestos group minerals may lead to serious health effects, when asbestos waste is produced, the asbestos waste should be processed safely and surely. Specifically, in case of waste slates used in many places, a sizable amount of wastes has been still produced through demolition. Although the asbestos wastes are mostly buried to the earth, it is prohibited to bury the asbestos wastes without preprocessing. In addition, since there exist the problems of difficulty in preprocessing, high cost, and the exposure of asbestos as an environmental contaminant, a technique of processing the asbestos wastes scientifically and safely at low cost has been keenly required. Meanwhile, a chemical processing scheme among the schemes of detoxifying asbestos developed until now includes a scheme of removing the fibrous structure by treating the surface of a product containing asbestos with strong acid, and a scheme of heating a product containing asbestos at high temperature for melting. However, according to such a scheme, the strong acid causes a more serious problem than the toxicity of the asbestos itself and the processing cost is greatly increased due to so much energy consumption by heating the asbestos wastes at high temperature. There is a related art for the present invention, such as Korean Unexamined Patent Publication No. 2012-0024103 (published on Mar. 14, 2012) entitled "method of preprocessing serpentine for mineral carbonation".

SUMMARY OF THE INVENTION

Therefore, to solve the problems described above, an object of the present invention is to provide a method of economically detoxifying the asbestos contained in the waste slate used as a construction material, where the minerals, such as limestone (or calcite, hereinafter referred to as limestone) which is a main component of the waste slate, containing Ca is perfectly removed by reacting with hydrochloric acid aqueous solution and then, the limestone concentrated by using oxalic acid is heat-treated at low temperature, so that the asbestos contained in the waste slate is detoxified simply and economically by 99% or more to prevent the human body from being damaged.

The objects of the present invention are not limited to the above-mentioned objects, and other objects, which are not described, can be clearly comprehended from the following description by those skilled in the art.

To achieve the above objects, a method of detoxifying asbestos of waste slate according to an embodiment of the present invention includes concentrating the asbestos by introducing hydrochloric acid aqueous solution into waste slate powder to dissolve and remove a limestone component contained in the waste slate; and mixing the concentrated asbestos with oxalic acid and performing a low-temperature heat treatment.

The hydrochloric acid aqueous solution has concentration in a range of 1% to 35%, and a mixing ratio (g/cc) of the waste slate powder to the hydrochloric acid aqueous solution is in a range of 1:8 to 1:10 based on 5% hydrochloric acid aqueous solution.

The oxalic acid is diluted with at least one selected from the group consisting of water, distilled water and deionized water.

A mixing ratio (g/cc) of the concentrated asbestos to the oxalic acid is in a range of 0.8:0.5 to 1.

The low-temperature heat treatment is performed at a temperature in a range of 50° C. to 150° C.

To achieve the above objects, a method of detoxifying asbestos of waste slate according to another embodiment of the present invention includes crushing and pulverizing the waste slate containing the asbestos; concentrating the asbestos by introducing hydrochloric acid aqueous solution into powder of the crushed and pulverized waste slate; and mixing the concentrated asbestos with organic acid and performing a low-temperature heat treatment.

The crushing of the waste slate is performed by a jaw crusher or a cone crusher, and the pulverizing of the waste slate is performed by a pulverizer.

The powder of the crushed and pulverized waste slate is formed in a size in a range of 100 meshes to 300 meshes.

The hydrochloric acid aqueous solution has concentration in a range of 1% to 35%, preferably, 5 to 10%, and a mixing ratio (g/cc) of the waste slate powder to the hydrochloric acid aqueous solution is in a range of 1:8 to 1:10 based on 5% hydrochloric acid aqueous solution.

The oxalic acid is diluted with at least one selected from the group consisting of water, distilled water and deionized water, and a mixing ratio (g/cc) of the concentrated asbestos to the oxalic acid is in a range of 0.8:0.5 to 1.

The low-temperature heat treatment is performed at a temperature in a range of 50° C. to 150° C.

To achieve the above objects, a detoxified asbestos according to still another embodiment of the present invention includes magnesium oxalate having a rhombohedral or amorphous shape which is formed by re-crystallizing an asbestos obtained through concentrating the asbestos by introducing hydrochloric acid aqueous solution into powder of crushed and pulverized waste slate, mixing the concentrated asbestos with oxalic acid and performing a low-temperature heat treatment.

The details of other embodiments are described in the detailed description and shown in the accompanying drawings.

The advantages, the features, and schemes of achieving the advantages and features of the present invention will be apparently comprehended by those skilled in the art based on the embodiments, which are detailed later in detail, together with accompanying drawings. The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims.

The same reference numerals denote the same elements throughout the specification, and sizes, positions, and coupling relationships of the elements may be exaggerated for clarity. In addition, the details of the generally-known technology that makes the subject matter of the present invention unclear will be omitted in the following description.

According to the embodiment of the present invention, the limestone contained in the waste slate is first preprocessed with the hydrochloric acid aqueous solution to concentrate asbestos. Then, when the concentrated asbestos is treated with organic acid, the fibrous structure of asbestos is dissolved, so that the concentrated asbestos is re-crystallized in a rhombohedral or amorphous shape. Thus, the asbestos can be detoxified by 99% or more in the simple and economical scheme for a short time even at the temperature of 100° C. or less. According to the embodiment of the present invention, since it is possible to perfectively detoxify a large quantity of asbestos at a low cost, environmental pollution can be prevented. In addition, since the neutralization reaction is utilized, there is no need to clean the waste slate with alkaline water.

According to the method of detoxifying asbestos of waste slate by using a low-temperature heat treatment of the present invention, the fibrous structure of asbestos contained in waste slate of a construction waste is dissolved and the asbestos is re-crystallized in a rhombohedral or amorphous shape, so that the maleficence of the asbestos is removed by 99% or more and the harmful asbestos is processed in large quantities.

Therefore, the asbestos harmful to the human body can be detoxified so that environmental pollution can be previously prevented, and in addition, the present invention can actively deal with various kinds of environmental regulations which may be introduced in future.

BRIEF DESCRIPTION OF DRAWINGS

FIGS. 2a to 2c are graphs showing X-ray diffraction analysis results before and after asbestos of waste slate is detoxified by preprocessing limestone according to an embodiment of the present invention, wherein FIG. 2a is an X-ray diffraction graph showing waste slate before asbestos of waste slate is detoxified by preprocessing limestone, and FIGS. 2b and 2c are an X-ray diffraction graph and an SEM photograph showing the residual obtained after waste slate powder is treated by using 5% hydrochloric acid aqueous solution.

FIGS. 3a to 3b are X-ray diffraction graphs and SEM photographs after asbestos of waste slate is detoxified by preprocessing limestone according to an embodiment of the present invention, wherein FIGS. 3a and 3b are an X-ray diffraction graph and an SEM photograph showing the residual which is heat-treated together with oxalic acid after waste slate powder is treated with hydrochloric acid aqueous solution.

DETAILED DESCRIPTION OF THE INVENTION

Hereinafter, an example embodiment of the present invention will be described in detail with reference to accompanying drawings.

Figure 1:
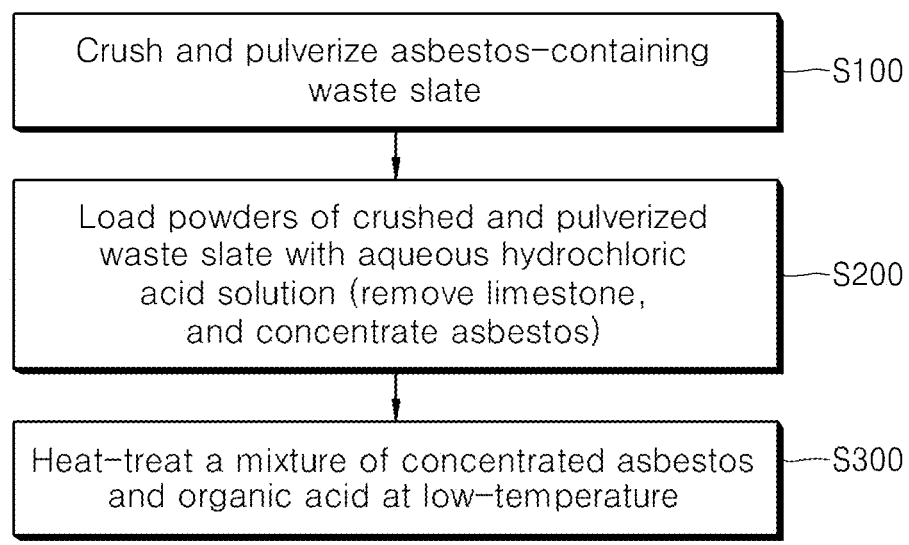
FIG. 1 is a flowchart illustrating a method of detoxifying asbestos of waste slate by preprocessing limestone according to an embodiment of the present invention.

FIG. 1 is a flowchart illustrating a method of detoxifying asbestos of a waste slate using a limestone preprocess according to an embodiment of the present invention.

Referring to FIG. 1, the method of detoxifying asbestos of a waste slate includes a step S100 of crushing and pulverizing the waste slate containing the asbestos, a step S200 of introducing hydrochloric acid aqueous solution into powder of the crushed and pulverized waste slate, and a step S300 of heat-treating a mixture of concentrated asbestos and organic acid at low temperature.

In this case, in the step S200 of introducing hydrochloric acid aqueous solution into the powder of the crushed and pulverized waste slate, preferably, all components such as limestone including calcium are removed so that the asbestos in the waste slate powder is concentrated.

Hereinafter, each step will be described in sequence.

Step of Crushing and Pulverizing Waste Slate Containing Asbestos

In the step of crushing and pulverizing waste slate containing asbestos which is selective, the waste slate containing asbestos is crushed and pulverized. As described above, the waste slate may be produced as one among various kinds of construction wastes.

For reference, the content of fibrous asbestos included in the waste slate may be in the range about 10 wt % to about 15 wt %.

In this case, although the waste slate must not be crushed and pulverized when the waste slate produced as a waste is broken into small pieces, it is preferable to crush and pulverize the waste slate into a size in the range of 100 meshes to 300 meshes to form waste slate powder.

The crushing of the waste slate may be performed by using a jaw crusher and a cone crusher. The pulverizing of the waste slate may be performed by using a pulverizer. In this case, the crushing and pulverizing are preferably performed under water in consideration of environment. Of course, it should be understood that the underwater signifies a fluid including water.

In this case, although the waste slate may be pulverized into a size less than 325 mesh (43 μm), it may be difficult to prepare the equipment capable of pulverizing the waste slate at the above size. In addition, when taking into consideration the time to perform the process of pulverizing the waste slate and the fact that the crushed asbestos may be exposed to an outside in the form of dust, it is not preferable to pulverize the waste slate into a size less than about 70 μm. To the contrary, when the waste slate is crushed into a size exceeding 0.5 mm, limestone contained in the waste slate may not be effectively removed in the subsequent reaction.

Step of Introducing Hydrochloric Acid Aqueous Solution into Powder of Crushed and Pulverized Waste Slate In the step S200 of introducing hydrochloric acid aqueous solution into the powder of crushed and pulverized waste slate, the hydrochloric acid aqueous solution is introduced into the powder of waste slate crushed and pulverized by the step S100. However, it should be understood that hydrochloric acid may be introduced into the waste slate.

First, the reason of introducing the hydrochloric acid aqueous solution in the present step will be described.

The inventors of the present invention had expected that the process of detoxifying asbestos may be more easily performed by a simpler scheme if the asbestos is separated from the waste slate by removing in advance limestone ($CaCO_3$), which is a main component of the waste slate, in the process of detoxifying asbestos contained in the waste slate. In detail, since the waste slate contains Ca component including limestone ($CaCO_3$) and water in the range of 70% to 75%, when the waste slate is detoxified according to a simple physical and chemical scheme, it is presumed that the cost such as the energy cost is unnecessarily increased as compared with the case of processing only pure asbestos. That is, since the waste slate consists of 10% to 15% of asbestos and the remaining of limestone, when the waste slate is melted or simply acidified, the cost is mainly spent for processing the limestone. Thus, the limestone is preprocessed with hydrochloric acid aqueous solution to remove the unnecessary Ca component of the limestone so that the asbestos may be concentrated. So, it was expected that the concentrated asbestos is enabled to be processed in large quantities with organic acid such as oxalic acid at the next stage. In addition, when the above described scheme is employed, the cost spent for detoxifying asbestos is greatly reduced, so that it is expected that even economic feasibility is secured. Therefore, it has been proposed that the waste slate is reduced to powder through the preprocess of crushing and pulverizing the waste slate as described in the step S100 and then, the hydrochloric acid aqueous solution is introduced into the waste slate powder.

In this case, it is preferable that the concentration of the hydrochloric acid aqueous solution is in the range of 1% to 35%, and more particularly, 5% to 10%.

When the concentration of the hydrochloric acid aqueous solution is less than 1%, the efficiency of removing the limestone contained in the waste slate may be insufficient. When the concentration of the hydrochloric acid aqueous solution exceeds 35%, the amount of non-reacted hydrochloric acid aqueous solution is much and the ratio of solid to liquid is lowered so that a problem may occur in the mixing of the solid and liquid. The chemical reaction occurring in the step S200 is as follows.

When the waste slate reacts with the hydrochloric acid aqueous solution, the components including Ca such as limestone are removed. The waste slate contains cement minerals, such as limestone, C2S and C3S, of about 35%, $SiO_2$ of about 15%, asbestos of about 12~15% and gypsum of about 3%. In this case, when the hydrochloric acid aqueous solution and limestone react with each other, $CaCl_2$ is generated according to following chemical formula 1 while $CO_2$ gas is generated.

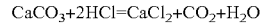

$$CaCO_3+2HCl=CaCl_2+CO_2+H_2O \quad \text{[Chemical Formula 1]}$$

The solid and liquid of the reaction result may be easily separated from each other using a centrifugal separator.

In this case, the liquid is mainly comprised of $CaCl_2$ aqueous solution, the main components of the solid are asbestos and $SiO_2$, and about 60 to 70 wt % of the initial material is removed and about 30 to 40 wt % of the initial material remains.

In this case, according to the result of searching for a component of residue or debris, asbestos is in the range of about 50 to 55% and $SiO_2$ is in the range of about 40 to 45%.

Of course, it will be known that $SiO_2$ does not participate in the reaction of the subsequent step of detoxifying asbestos. Preferably, the step S200 is performed at room temperature and atmosphere pressure.

In addition, the step S200 is preferably performed for about 20 minutes to about one hour. If the step S200 is performed for less than 20 minutes, the limestone contained in the waste slate powder is insufficiently removed. If the step S200 is performed for more than one hour, the time taken to process the limestone is increased so that it is disadvantageous to the removal of the limestone.

Meanwhile, it is preferable to mix the hydrochloric acid aqueous solution (at 5%) with the waste slate powder at the ratio of the hydrochloric acid aqueous solution of 40~45 cc to the waste slate powder of 5 g. In the step S200, the limestone contained in the waste slate powder is quite removed by 99% or more. In the next step, it can be more easily performed to detoxify the asbestos contained in the waste slate powder.

In this case, the finally concentrated asbestos consists of 50% to 55% of the asbestos, the remaining of $SiO_2$ and the others of $Al_2O_3$ and $Fe_2O_3$.

Step of Heat-Treating a Mixture of Concentrated Asbestos and Organic Acid at Low Temperature The step S300 of heat-treating a mixture of concentrated asbestos and organic acid at low temperature is a step in which the mixture, which is obtained by mixing the asbestos concentrated through the step S200 with the organic acid, is heat-treated at low temperature.

In this case, the organic acid may easily derive the chelation reaction in the subsequent low temperature heat treatment due to high reactivity and a low melting point, but the embodiment is not limited thereto.

For example, the organic acid may include at least one selected from the group consisting of oxalic acid ($C_2H_2O_4$), citric acid, glycolic acid, glycolate, ether, polyglycolic acid, ester, EDTA and chloroacetic acid. Preferably, the organic acid may be oxalic acid ($C_2H_2O_4$).

In this case, when the concentrated asbestos and the organic acid react with each other, although the organic acid may be used at a dry condition, preferably, the organic acid may be diluted with at least one selected from the group consisting of water, distilled water and deionized water. That is, when the organic acid of dry condition is used, there is a high possibility that the concentrated asbestos and the organic acid are not uniformly mixed with each other. However, when the organic acid is dissolved into water, distilled water or deionized water, the organic acid may be uniformly mixed with the concentrated asbestos, so that the reaction between the concentrated asbestos and the organic acid may be effectively performed.

In addition, the concentrated asbestos and the organic acid, preferably, oxalic acid may be mixed with each other at the ratio (g/cc) of 0.8 to 0.5~1. When the mixing ratio is less than the above ratio, the asbestos may not be perfectly detoxified. When the mixing ratio exceeds the above ratio an excessive amount of organic acid is spent during the process reaction so that it is disadvantageous in terms of economy.

Next, the low-temperature heat treatment may be performed for time in the range of 40 to 120 minutes at temperature in the range of 50° C. to 150° C. However, when the low-temperature heat treatment is performed at less than 50° C., the reaction is very slow, the concentrated asbestos may be not re-crystallized in a rhombohedral or amorphous shape. The low-temperature heat treatment is performed at more than 150° C., the excessive quantity of energy is spent so that it is economically disadvantageous.

Hereinafter, the low-temperature heat treatment after the reaction of the concentrated asbestos and the organic acid will be described in detail, wherein oxalic acid is used as the organic acid. When the oxalic acid is used as the organic acid, the reaction is performed as following chemical formula 2. The concentrated asbestos ($Mg_3Si_2O_5(OH)_4$) reacts with the oxalic acid so that the chelation reaction occurs to form magnesium oxalate ($Mg_3Si_2O_5(OH)_4$). That is, while the magnesium oxalate ($MgC_2O_4$) is formed, a neutralization reaction occurs to generate a silicon dioxide and water. In this case, the magnesium oxalate, which has the shape of a square column in a hexahedron structure, that is, a rhombohedral or amorphous shape, is quite different from the fibrous structure of asbestos which is fatal to the human body.

Thus, it may be considered that the asbestos is detoxified.

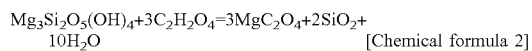
[Chemical formula 2]

Therefore, according to an embodiment of the present invention, the hydrochloric acid aqueous solution is introduced into the waste slate to concentrate the asbestos. The concentrated asbestos and the organic acid is mixed with each other to obtain the re-crystallized magnesium oxalate having a rhombohedral or amorphous shape, so that it can be confirmed that the asbestos is detoxified by 99% or more.

Embodiment

The waste slate powder of 5 g and the 5% hydrochloric acid aqueous solution of 42 cc were allowed to react with each other for one hour while $CO_2$ was slowly generated. After the reaction, the pH was 2.5.

Then, the solids and liquid were separated from each other using a centrifugal separator to recover the solids, and then, the recovered solids were dried in a dryer for about 24 hours at 90° C.

Figure 2A:
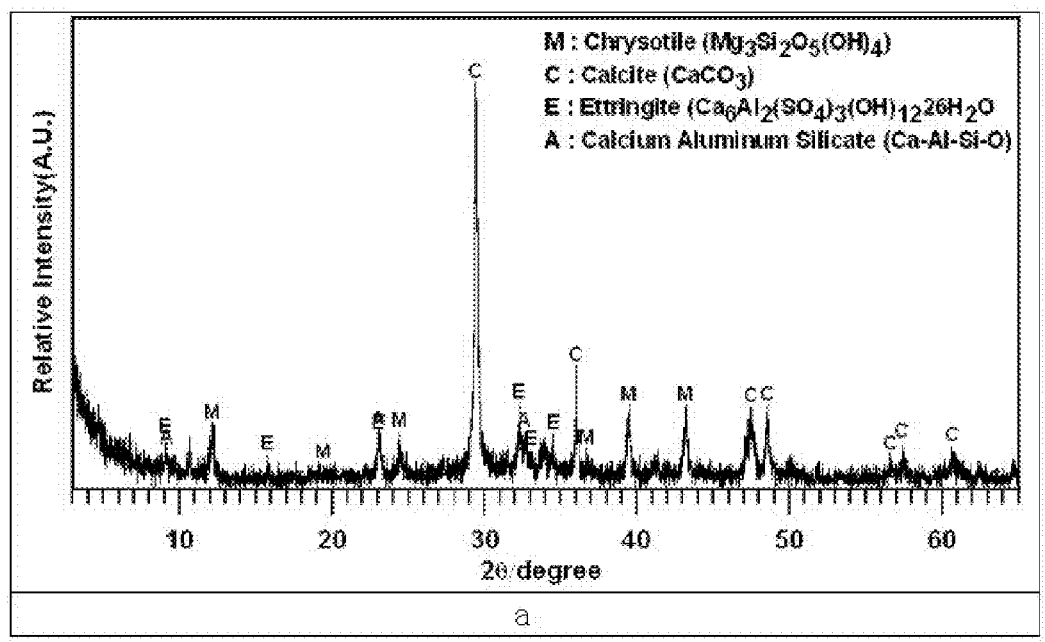
Figure 2B:
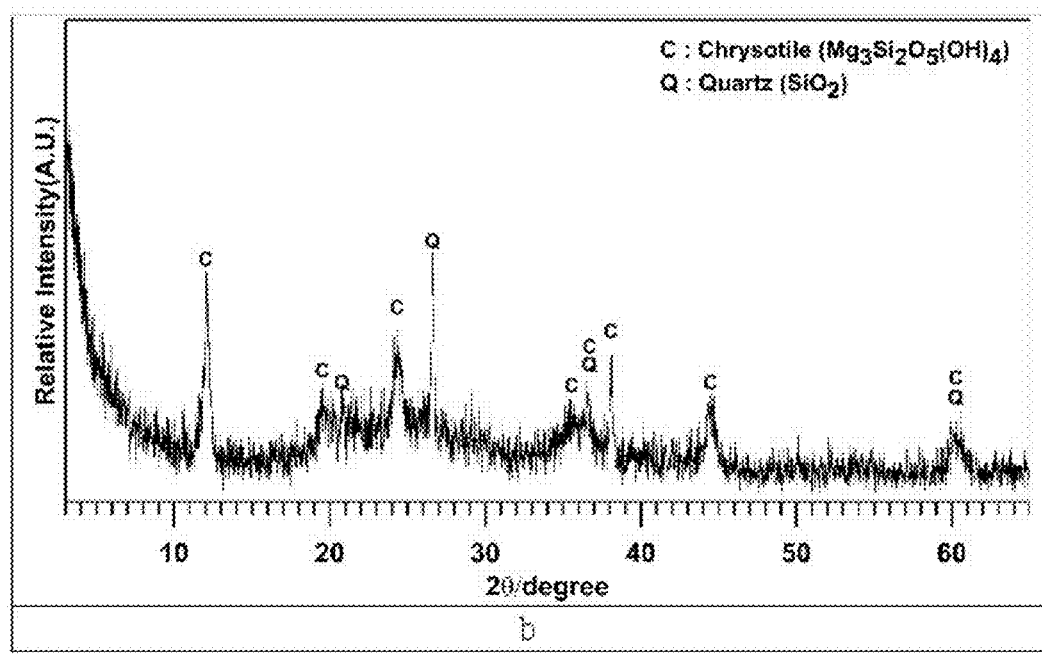
Figure 2C:
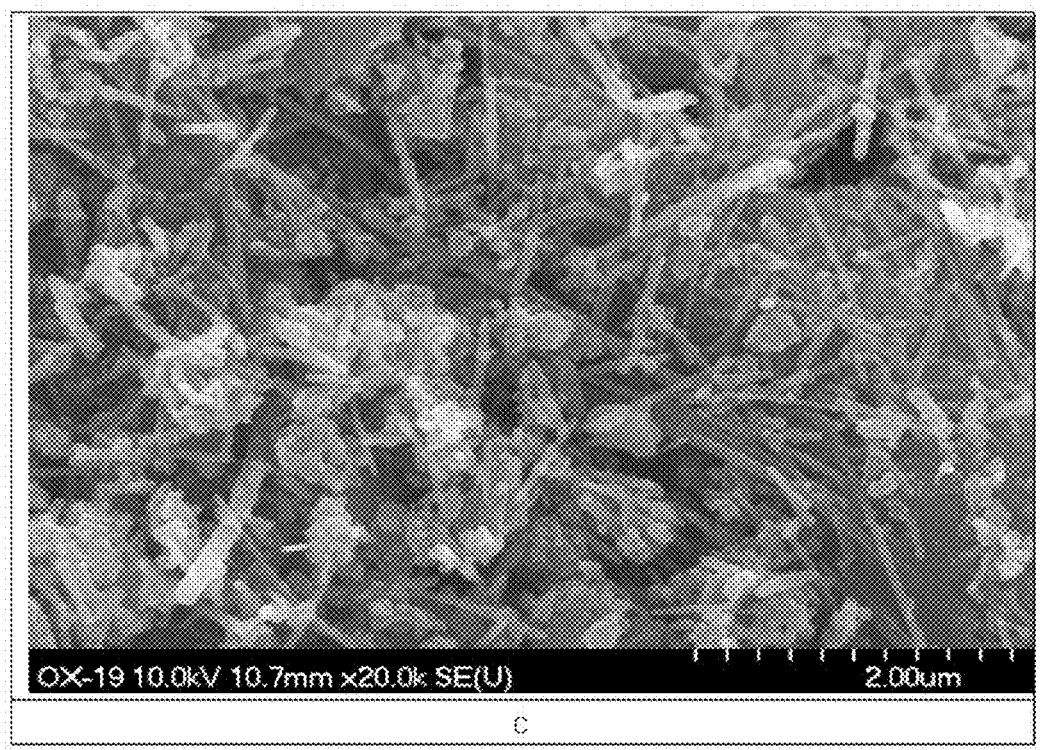

Next, the phases of the solids were analyzed by an X-ray diffraction (XRD) and a scanning electron microscope (SEM), so that only chrysotile ($Mg_3Si_2O_5(OH)_4$) and $SiO_2$ were found (see FIGS. 2a, 2b and 2c).

In this case, the weight of the recovered solids was 1.54 g which is 30% based on the initial material. According to the calculation result based on the chemical analyzing result, the chrysotile was about 60% based on the entire solids, that is, 0.9 g, and $SiO_2$ was about 40%, that is, 0.6 g. After, the recovered solids of 1.54 g and the 10% oxalic acid ($C_2H_2O_4 \cdot 2H_2O$) aqueous solution of 12 cc were mixed and reacted with each other for 3 hours at 100° C., they were again analyzed by the XRD and SEM.

Only the magnesium oxalate and $SiO_2$ having the amorphous shapes were observed in the final reaction product, but the asbestos having the fibrous structure was not observed at all.

Figure 3A:
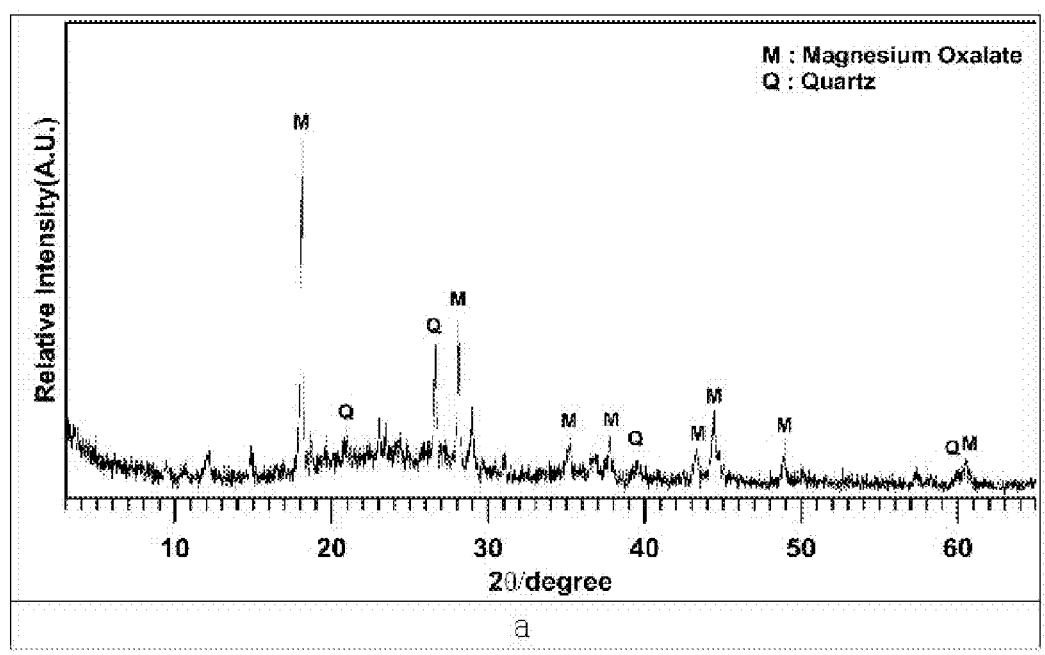
Figure 3B:
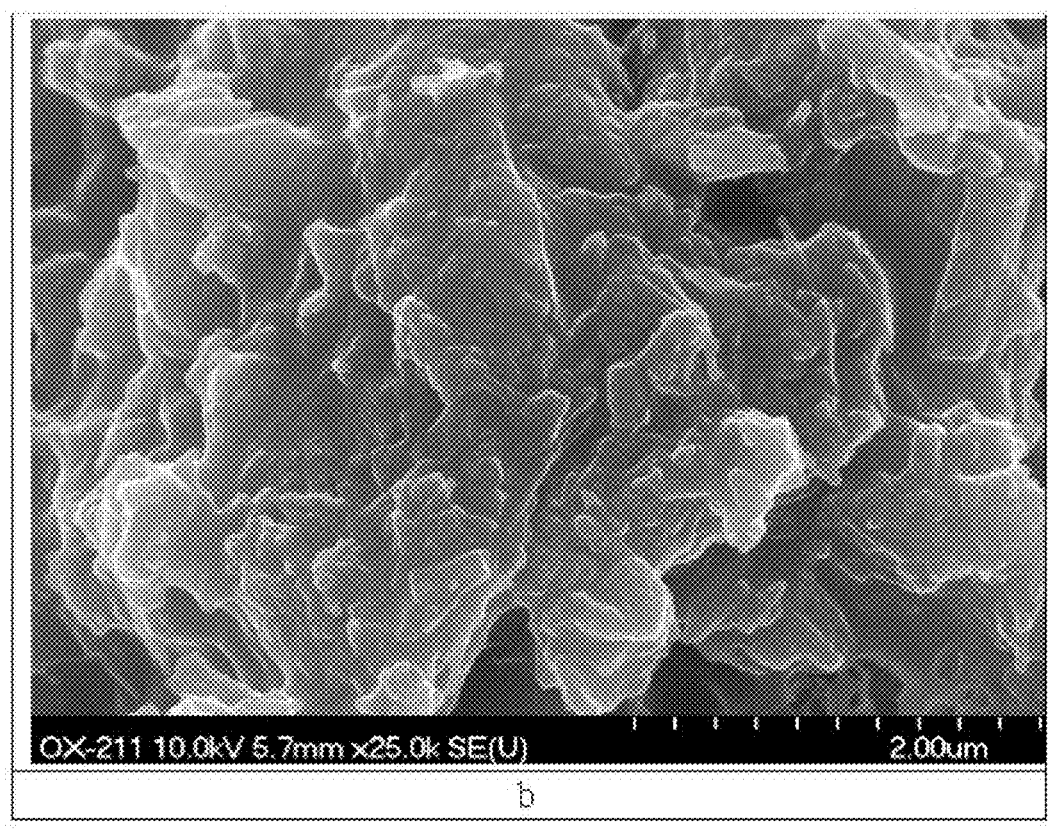

Thus, it was confirmed that the waste slate containing the asbestos harmful to the human body was quite detoxified (see FIGS. 3a and 3b).

Comparative Example 1

Quantity of Hydrochloric Acid Aqueous Solution

The waste slate powder of 5 g and the 5% hydrochloric acid aqueous solution of 30 cc were allowed to react with each other for 0.5 hours while $CO_2$ was slowly generated. After the reaction, the pH was 5.7.

Then, the solids and liquid were separated from each other using a centrifugal separator to recover the solids, and then, the recovered solids were dried in a dryer for about 24 hours at 90° C.

Next, the phases of the solids were analyzed by an X-ray diffraction (XRD) and a scanning electron microscope (SEM), so that only chrysotile ($Mg_3Si_2O_5(OH)_4$), $SiO_2$ and $CaCO_3$ were found.

In this case, the recovered solids were 2.32 g. After the recovered solids of 2.32 g and the 10% oxalic acid ($C_2H_2O_4 \cdot 2H_2O$) aqueous solution of 12 cc were mixed and reacted with each other for 3 hours at 100° C., they were again analyzed by the XRD and SEM.

Figure 4A:
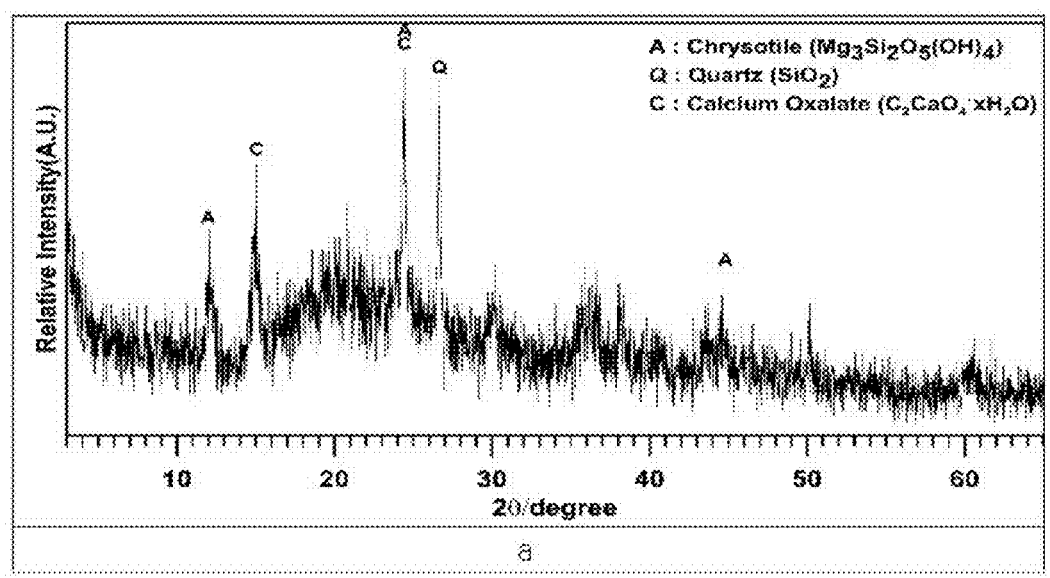
FIG. 4a is an X-ray diffraction graph showing asbestos and ca-oxalate at the same time as a phenomenon appearing when a required quantity of hydrochloric acid aqueous solution is less introduced so that the reaction is insufficient.

However, rhombohedral potassium oxalate, chrysotile and $SiO_2$ were observed in the final reaction product, so that the asbestos was partially detoxified (see FIG. 4a).

Comparative Example 2

Reaction Time

The waste slate powder of 5 g and the 5% hydrochloric acid aqueous solution of 42 cc were allowed to react with each other for 10 minutes while $CO_2$ was generated. After the reaction, the pH was 4.3.

Then, the solids and liquid were separated from each other using a centrifugal separator to recover the solids, and then, the recovered solids were dried in a dryer for about 24 hours at 90° C.

Next, the phases of the solids were analyzed by an X-ray diffraction (XRD) and a scanning electron microscope (SEM), so that only chrysotile ($Mg_3Si_2O_5(OH)_4$), $SiO_2$ and $CaCO_3$ were found.

In this case, the recovered solids were 1.8 g. After the recovered solids of 1.8 g and the 10% oxalic acid ($C_2H_2O_4.2H_2O$) aqueous solution of 12 cc were mixed and reacted with each other for 3 hours at 100° C., they were again analyzed by the XRD and SEM.

Figure 4B:
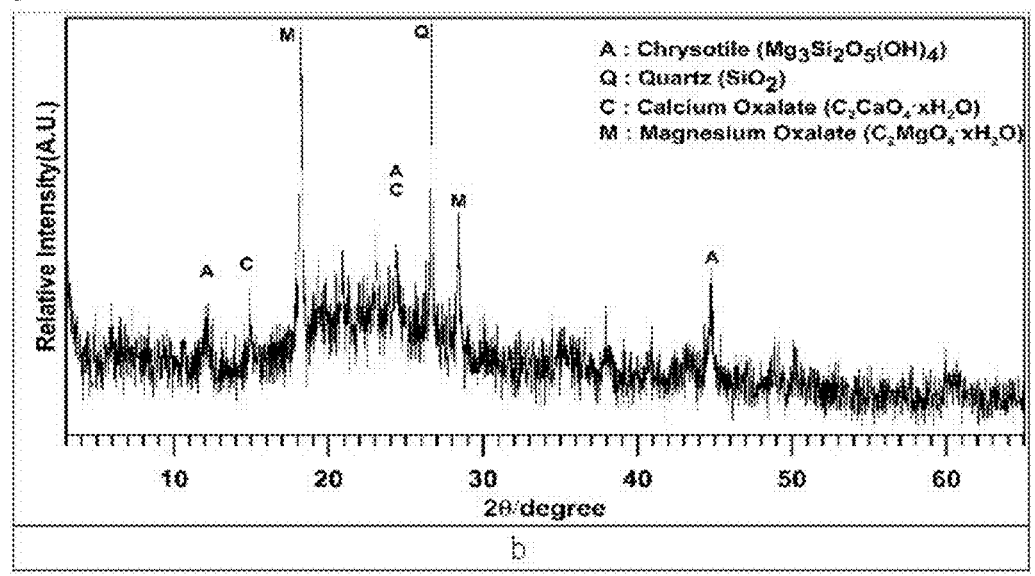
FIG. 4b is an X-ray diffraction graph simultaneously showing ca-oxalate, magnesium oxalate and asbestos appearing when the reaction time of waste slate powder and hydrochloric acid aqueous solution is insufficient.

However, rhombohedral potassium oxalate, chrysotile and $SiO_2$ were observed in the final reaction product, so that the asbestos was not completely detoxified (see FIG. 4b).

Comparative Example 3

Quantity of Oxalic Acid

The waste slate powder of 5 g and the 5% hydrochloric acid aqueous solution of 42 cc were allowed to react with each other for one hour while $CO_2$ was slowly generated. After the reaction, the pH was 2.5.

Then, the solids and liquid were separated from each other using a centrifugal separator to recover the solids, and then, the recovered solids were dried in a dryer for about 24 hours at 90° C.

Next, the phases of the solids were analyzed by an X-ray diffraction (XRD) and a scanning electron microscope (SEM), so that only chrysotile ($Mg_3Si_2O_5(OH)_4$) and $SiO_2$ were found.

In this case, the recovered solids were 1.5 g. As the calculation result based on the chemical analyzing result, the chrysotile was about 60% of the entire solids, that is, 0.9 g, and $SiO_2$ was about 40%, that is, 0.6 g.

After, the recovered solids of 1.5 g and the 10% oxalic acid ($C_2H_2O_4.2H_2O$) aqueous solution of 9 cc were mixed and reacted with each other for 3 hours at 100° C., they were again analyzed by the XRD and SEM.

Only, the magnesium oxalate having the rhombohedral shape, $SiO_2$ and a very small amount of the asbestos harmful to the human body were observed in the final reaction product.

Therefore, it was confirmed that the asbestos contained in the waste slate is not quite detoxified.

Modified Example

Processing of Sulfuric Acid

The waste slate powder of 5 g and the 5% hydrochloric acid aqueous solution of 40 cc were allowed to react with each other for one hour while $CO_2$ was slowly generated. After the reaction, the pH was 2.2.

Then, the solids and liquid were separated from each other using a centrifugal separator to recover the solids, and then, the recovered solids were dried in a dryer for about 24 hours at 90° C. In this case, the recovered solids were 4.9 g.

Next, the phases of the solids were analyzed by an X-ray diffraction (XRD) and a scanning electron microscope (SEM), so that chrysotile ($Mg_3Si_2O_5(OH)_4$), $SiO_2$ and a great quantity of gypsum ($CaCO_3$) were found.

However, since the gypsum and the chrysotile may not be separately reacted with oxalic acid, it should be understood that it is meaningless to detoxify the waste slate with the sulfuric acid.

The following Table 1 shows the quantity (g) of the waste slate powder, the quantity (cc) of hydrochloric acid aqueous solution (5% aqueous solution), the quantity (cc) of oxalic acid, the temperature (° C.) of the low-temperature heat treatment, and the time of the low-temperature heat treatment in the embodiment, the comparative examples 1 to 3 and the modified example.

TABLE 1

| | Waste slate powder (g) | Hydrochloric acid aqueous solution (cc) | Preprocessing (Minutes) | Recovery solid (g) | Oxalic acid (cc) | Heat-treatment temperature (° C.) | Heat-treatment time (Hours) |
|---|---|---|---|---|---|---|---|
| Embodiment | 5 | 42 | 60 | 1.54 | 12 | 100 | 3 |
| Comparative example 1 | 5 | 30 | 60 | 2.32 | 12 | 100 | 3 |
| Comparative example 2 | 5 | 42 | 10 | 1.8 | 12 | 100 | 3 |
| Comparative example 3 | 5 | 42 | 60 | 1.5 | 9 | 100 | 3 |
| Modified example | 5 | Sulfuric acid: 40 | 60 | 4.9 | — | — | — |

Although the present invention has been described by making reference to the embodiments and accompanying drawings, it should be understood that the present invention is not limited to the embodiments but includes all modifications, equivalents and alternatives. Accordingly, those skilled in the art should understand the spirit and scope of the present invention as defined in the following claims. In addition, those skilled in the art should understand that the equivalents and the modifications belong to the scope of the spirit of the present invention.

What is claimed is:

1. A method of detoxifying asbestos of waste slate, the method comprising:
   concentrating the asbestos by introducing hydrochloric acid aqueous solution into waste slate powder to dissolve and remove a limestone component contained in the waste slate; and
   mixing the concentrated asbestos with oxalic acid and performing a low-temperature heat treatment to form a magnesium oxalate ($MgC_2O_4$) having a rhombohedral or amorphous shape,
   wherein a mixing ratio (g/cc) of the waste slate powder to the hydrochloric acid aqueous solution is in a range of 1:8 to 1:10 based on 5% hydrochloric acid aqueous solution,
   wherein a mixing ratio (g/cc) of the concentrated asbestos to the oxalic acid is in a range of 0.8:0.5 to 1, and
   wherein the low-temperature heat treatment is performed at 100° C.

2. The method of claim 1, wherein the oxalic acid is diluted with at least one selected from the group consisting of water, distilled water and deionized water.

3. A method of detoxifying asbestos of waste slate, the method comprising:
- crushing and pulverizing the waste slate containing the asbestos; concentrating the asbestos by introducing hydrochloric acid aqueous solution into powder of the crushed and pulverized waste slate; and mixing the concentrated asbestos with oxalic acid and performing a low-temperature heat treatment,
- wherein a mixing ratio (g/cc) of the waste slate powder to the hydrochloric acid aqueous solution is in a range of 1:8 to 1:10 based on 5% hydrochloric acid aqueous solution,
- wherein a mixing ratio (g/cc) of the concentrated asbestos to the oxalic acid is in a range of 0.8:0.5 to 1, and
- wherein the low-temperature heat treatment is performed at 100° C.

4. The method of claim 3, wherein the crushing of the waste slate is performed by a jaw crusher or a cone crusher, and
the pulverizing of the waste slate is performed by a pulverizer.

5. The method of claim 3, wherein the powder of the crushed and pulverized waste slate is formed in a size in a range of 100 meshes to 300 meshes.

6. The method of claim 3, wherein the oxalic acid is diluted with at least one selected from the group consisting of water, distilled water and deionized water.

* * * * *